United States Patent
Hillis

(10) Patent No.: US 6,220,394 B1
(45) Date of Patent: Apr. 24, 2001

(54) WEIGHT OPERATED MECHANICAL DRIVE

(75) Inventor: W. Daniel Hillis, Toluca Lake, CA (US)

(73) Assignee: The Long Now Foundation, Sausalito, CA (US)

( * ) Notice: Subject to any disclaimer, the term of this patent is extended or adjusted under 35 U.S.C. 154(b) by 0 days.

(21) Appl. No.: 09/422,842

(22) Filed: Oct. 21, 1999

(51) Int. Cl.⁷ ........................................................ F03G 3/00
(52) U.S. Cl. ................................ 185/32; 185/27; 74/89.15
(58) Field of Search .................................... 185/4, 5, 6, 7, 185/27, 28, 31, 32, 33, 35, 36; 74/89.15; 368/168, 169

(56) References Cited

U.S. PATENT DOCUMENTS

| 16,344 | * | 1/1857 | Tuerlingx | 185/32 X |
| 425,097 | * | 4/1890 | Friess et al. | 185/27 |
| 471,886 | * | 3/1892 | Omer | 185/27 |
| 1,970,452 | * | 8/1934 | Grubman | 185/27 X |
| 4,587,084 | * | 5/1986 | Hawke | 185/33 X |

FOREIGN PATENT DOCUMENTS

2768188 * 3/1999 (FR) .

* cited by examiner

*Primary Examiner*—Allan D. Herrmann
(74) *Attorney, Agent, or Firm*—Michael Glenn

(57) ABSTRACT

A weight operated mechanical drive consists of a cylindrical weight that is suspended by a helically threaded drive screw which passes through and engages with complementary threads within a bore defined along a rotational axis thereof. The weight turns the drive screw as it falls due to the force of gravity. The weight is prevented from rotating about the axis of the screw while it is falling by a wheel which is attached thereto and which rolls against a retaining bar that runs alongside the weight along the weight's path of travel. The retaining bar is also used to wind the weight. To do so, the retaining bar is rotated around the rotational axis of the drive screw. This action forces the weight along a path defined by the helical threads of the drive screw. The retaining bar is formed as a helix around a column through which the weight drops. The helix of the retaining bar winds in the same direction of that of the threads on the drive screw, and at a pitch that is almost at right angles to the pitch of the drive screw threads. This arrangement assures that the torque imparted to the drive screw by the weight is not changed during winding of the weight. Such arrangement is particularly advantageous for a clock mechanism, where the drive must supply continuous torque, even while the clock is being wound.

6 Claims, 5 Drawing Sheets

WEIGHT OPERATED MECHANICAL DRIVE

BACKGROUND OF THE INVENTION

1. Technical Field

The invention relates to mechanical drives. More particularly, the invention relates to a weight operated mechanical drive.

2. Description of the Prior Art

Mechanical drives operate all sorts of devices from wind-up toys to grandfather clocks. Such drives come in many forms, but they all must store mechanical energy, whether it be in a compressed spring, in an elevated weight, or in some other form. One requirement of such drives is that they release their stored energy in an even and predictable way. For example, a pendulum operated escapement can be used to control the release of stored energy in a clock mechanism. Another requirement for such drives is that the store of energy be recharged after it has been released through mechanical action. For example, a clock mechanism is wound, e.g. by a key which retensions a spring or by elevating a weight.

Weight operated mechanical drives are well known. Weights have the potential to provide energy to the drive in a consistent fashion. Unlike springs, which do not provide constant torque throughout their range of energy release, a weight ideally provides the same torque throughout its entire range of energy release. This is due to the fact that a spring is constrained by the properties of the material from which it is made and the characteristics of those materials over a wide range of tension, e.g. when the spring is first wound vs. when the spring needs rewinding. In contrast, a weight is only constrained by the force of gravity which, for all intents and purposes, is constant.

Weight operated drives include one or more weights that typically hang suspended from a regulating mechanism. The tension imparted to the regulating mechanism by the pull of gravity on the weight provides the driving force to the mechanism. Thus, the controlled falling of the weight operates the mechanism. Such weight operated mechanical drives are "wound" (a term that is perhaps more properly applied to the tensioning of a spring, but that is used herein in the same sense of storing energy for use by the mechanism) by raising the weight, e.g. by pulling a chain or rope to which the weight is attached. Typically, such winding action momentarily suspends operation of the mechanism because the weight is lifted from the mechanism during a winding sequence. As such, it does not pull on the regulating mechanism during such winding sequence. In most clocks such interruption in operation is of negligible consequence. However, in critical applications, such momentary release of torque on the drive produces an error that, over time, cumulates to an unacceptable degree.

It would be advantageous to provide a weight operated mechanical drive that allowed a weight to impart energy thereto in a consistent fashion, both while the weigh is falling (operating the mechanism) and while the weight is being elevated (wound).

SUMMARY OF THE INVENTION

The invention provides a weight operated mechanical drive. The drive consists of a cylindrical weight that is suspended by a helically threaded drive screw which passes through and engages with complementary threads within a bore defined along a rotational axis thereof. The weight turns the drive screw as it falls due to the force of gravity. The weight is prevented from rotating about the axis of the screw while it is falling by a wheel which is attached thereto and which rolls against a retaining bar that runs alongside the weight along the weight's path of travel. The retaining bar is also used to wind the weight. To do so, the retaining bar is rotated around the rotational axis of the drive screw. This action forces the weight along a path defined by the helical threads of the drive screw. The retaining bar is formed as a helix around a column through which the weight drops. The helix of the retaining bar winds in the same direction of that of the threads on the drive screw, and at a pitch that is almost at right angles to the pitch of the drive screw threads. This arrangement assures that the torque imparted to the drive screw by the weight is not changed during winding of the weight. Such arrangement is particularly advantageous for a clock mechanism, where the drive must supply continuous torque, even while the clock is being wound.

DETAILED DESCRIPTION OF THE INVENTION

Figure 1:
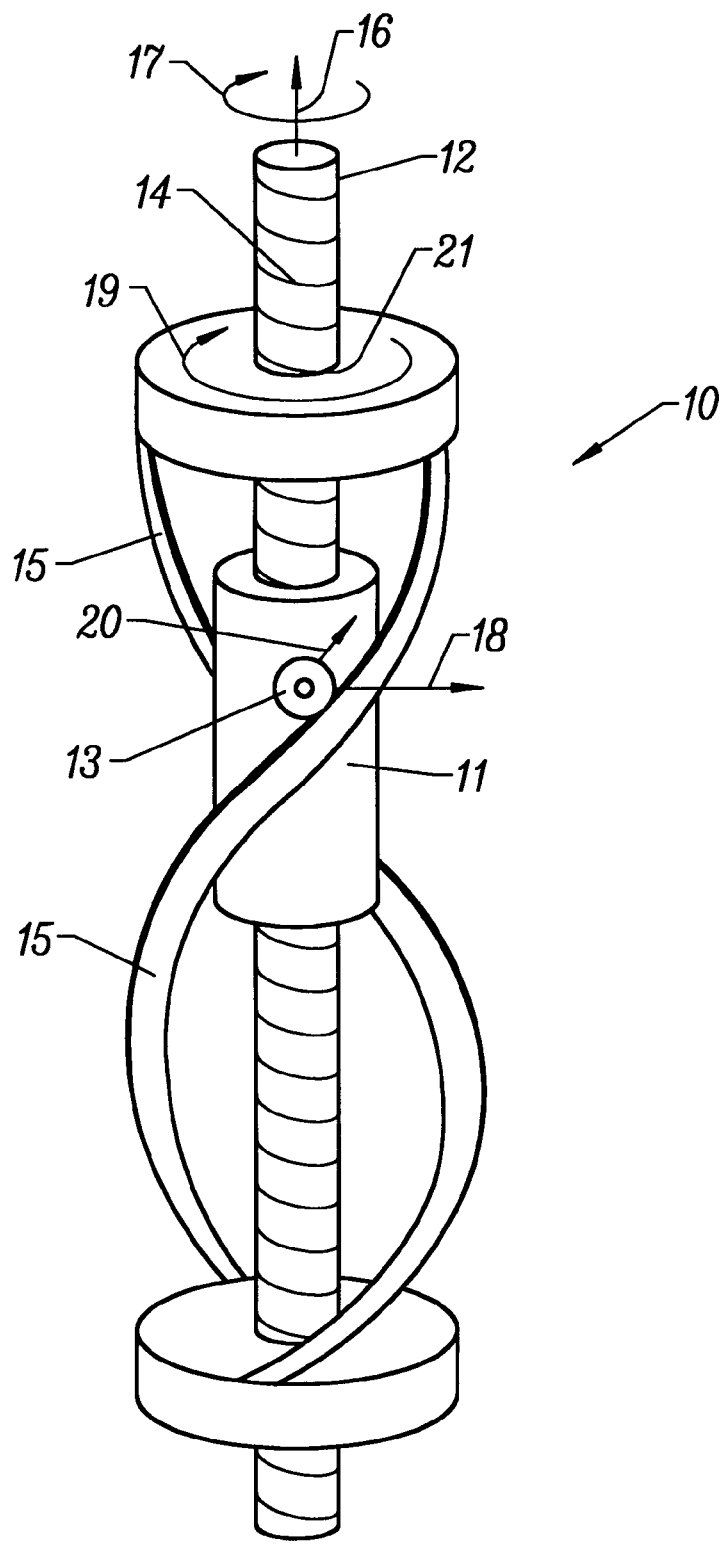
FIG. 1 is a partial perspective schematic diagram of a weight operated mechanical drive according to the invention.

FIG. 1 is a partial perspective schematic diagram of a weight operated mechanical drive according to the invention. The drive 10 consists of a cylindrical weight 11 that is suspended by a helically threaded 14 drive screw 12 which passes through and engages with complementary threads (not shown) within a bore 21 defined along a rotational axis thereof 16. It will be appreciated by those skilled in the art that the shape of the weight is not critical to the operation of the invention. Accordingly, the weight need not be cylindrical, but may be any other shape, e.g. cubic, consistent with the teachings herein. Further, while FIG. 1 shows helical threads having a particular orientation, the actual threading of the drive shaft may be in any orientation, consistent with the teachings herein.

The weight turns the drive screw as it falls due to the force of gravity. As a result, the drive screw rotates about its axis 17. Although not shown, it will be appreciated by those skilled in the art that the rotation of the drive shaft is used to operate a mechanism, such as a clock. Accordingly, the drive shaft is readily coupled to such mechanism using techniques known to those skilled in the art. Further, while two retaining bars are shown, each of which is engaged by a separate wheel (although only one wheel is shown in FIG. 1), it will be appreciated by those skilled in the art that any number of retaining bar/wheel elements can be provided. However, it is preferred that such elements be equally spaced, such that operation of the drive is balanced. Further, the number of such elements is preferably limited due to the friction that may be introduced by using an excessive number thereof.

The weight is prevented from rotating about the axis of the screw while it is falling by a wheel 13 which is attached thereto and which rolls against a retaining bar 15 that runs alongside the weight along the weight's path of travel. As shown in connection with FIG. 2 (discussed below), the wheel projects from the weight at a substantially right angle thereto and provides a rolling surface that engages with the retaining bar in a manner that minimizes friction at the point where the wheel engages the retaining bar. It will be appreciated by those skilled in the art that the function served by the wheel may be equally well served by any element that abuts with the retaining bar to prevent rotation of the weight during its fall, such that only the drive screw rotates.

The retaining bar is also used to wind the weight. To do so, the retaining bar is rotated around the rotational axis of the drive screw in the same direction 19 thereof by a winding mechanism (see FIG. 3). Thus, the drive screw and the retaining bar are configured to rotate about the same axis independently of each other. This action forces the weight along an upward path 20 defined by the helical threads of the drive screw. The retaining bar is formed as a helix around a column (see FIG. 2) through which the weight drops. The helix of the retaining bar winds in the same direction of that of the threads on the drive screw, and at a pitch that is almost at right angles to the pitch of the drive screw threads. The weight is thus lifted along the surface of the retaining bar during a winding operation. While the weigh is lifted, it is also pressing downwardly against the retaining bar, such that a force vector 18 is produced. The retaining bar counteracts this force vector, thus imparting a weight mediated force to the drive screw while at the same time that it lifts the weight. This arrangement assures that the torque imparted to the drive screw by the weight is not changed during winding of the weight. Such arrangement is particularly advantageous for a clock mechanism, where the drive must supply continuous torque, even while the clock is being wound.

Figure 2:
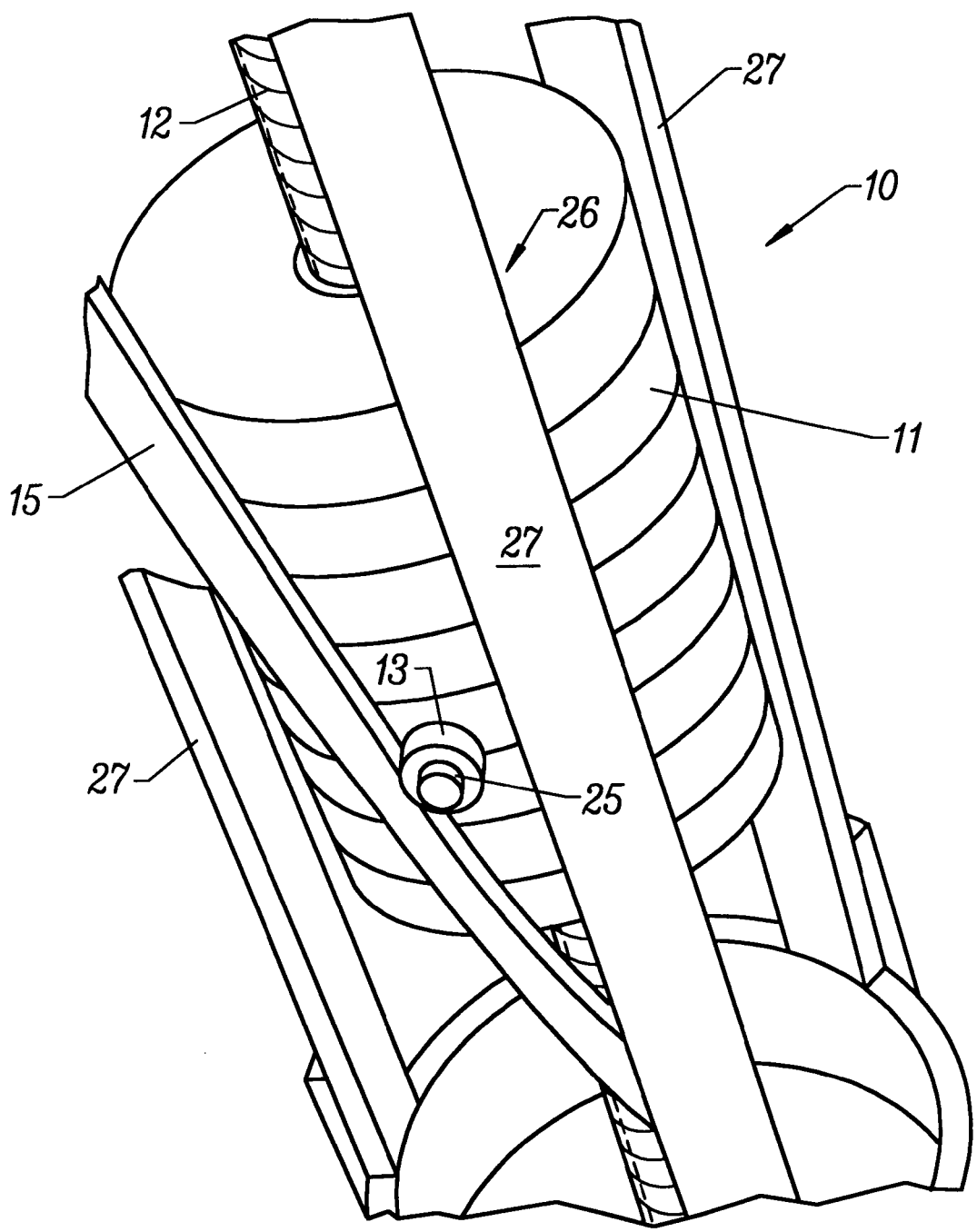
FIG. 2 is a partial perspective illustration of a weight operated mechanical drive, showing a weight, drive screw, and retaining bar configured according to the invention.

FIG. 2 is a partial perspective illustration of a weight operated mechanical drive 10, showing a weight 11, drive screw 12, and retaining bar 15 configured 25 according to the invention. In FIG. 2, the wheel 13 is shown coupled to a shaft 25 and arranged to be freely rotatable about the axis thereof. A column 26 through which the weight drops is defined by a plurality of elongate support members 27. The column may take many forms. For example, the column may also be a solid cylinder.

Figure 3:
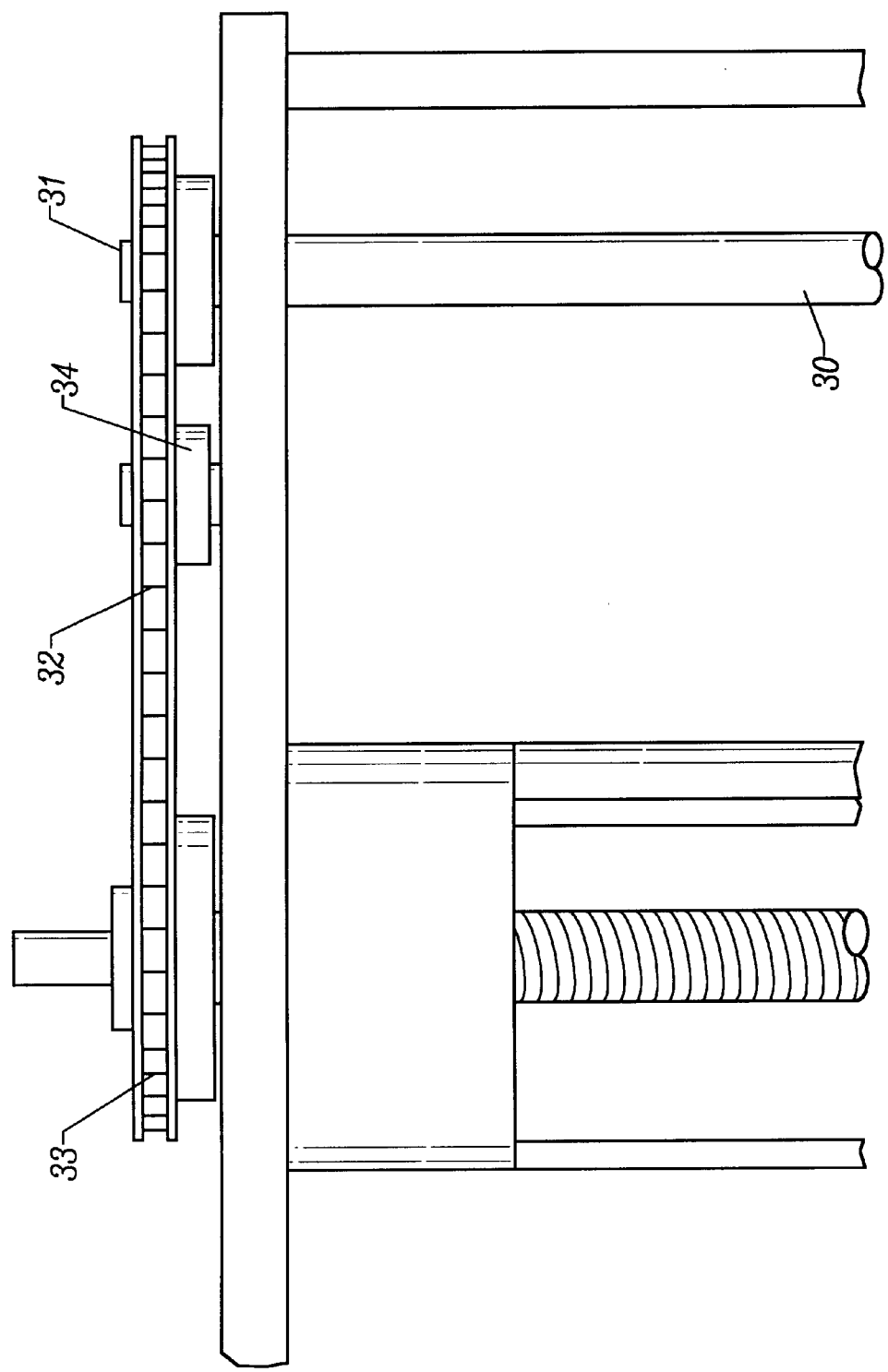
FIG. 3 is a partial perspective diagram of a weight operated mechanical drive, showing a winding mechanism according to the invention.

FIG. 3 is a partial perspective diagram of a weight operated mechanical drive, showing a winding mechanism according to the invention. In this embodiment of the invention a winding shaft 30 rotates a toothed gear 31 which, in turn, pulls a chain 32. The chain in turn rotates a second toothed gear 33 which turns the retaining bar. The chain drive also includes a tensioner 34 to maintain constant tension on the chain and assure smooth operation of the winding mechanism during a winding operation. Those skilled in the art will appreciate that the actual winding mechanism is a matter of choice and that it is only important that the retaining bar be rotated to effect winding of the weight. As noted above, the retaining bar and the drive shaft are arranged to rotate about the same axis independently of each other. For example, a simple clutch mechanism may be used. Such arrangement is a matter of choice to those skilled in the art.

Figure 4:
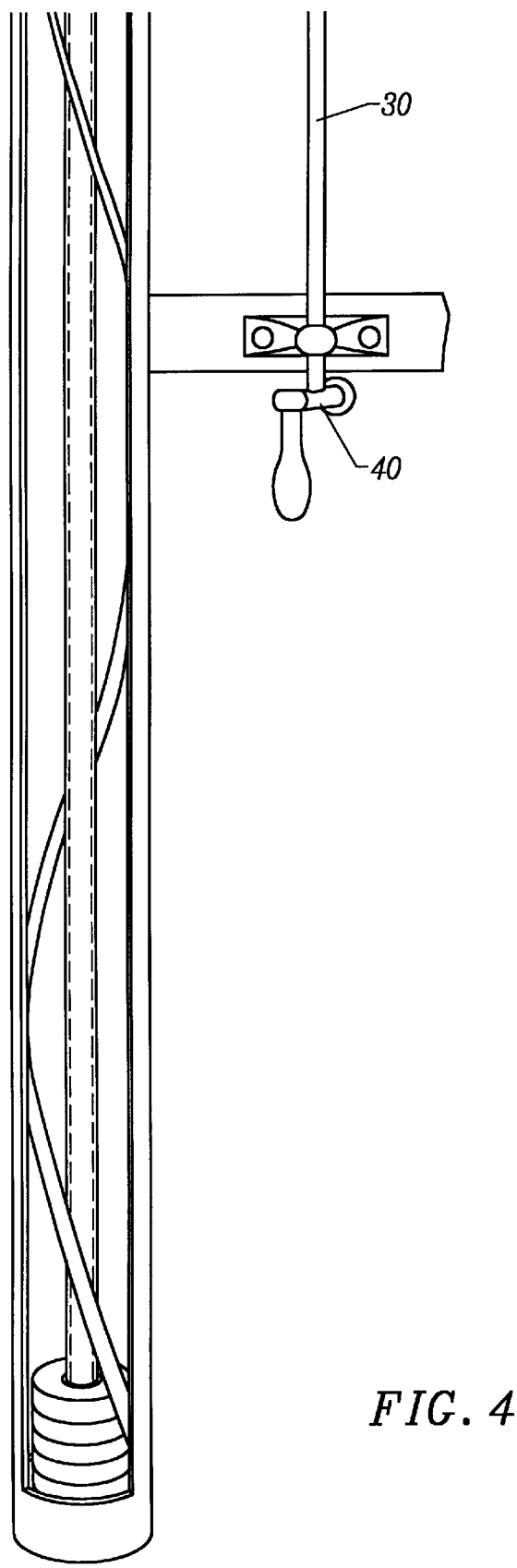
FIG. 4 is a second partial perspective diagram of a weight operated mechanical drive, showing a winding mechanism according to the invention.

FIG. 4 is a second partial perspective diagram of a weight operated mechanical drive, showing a winding mechanism according to the invention. In FIG. 4, the winding shaft is shown being operable by a handle 40.

Figure 5:
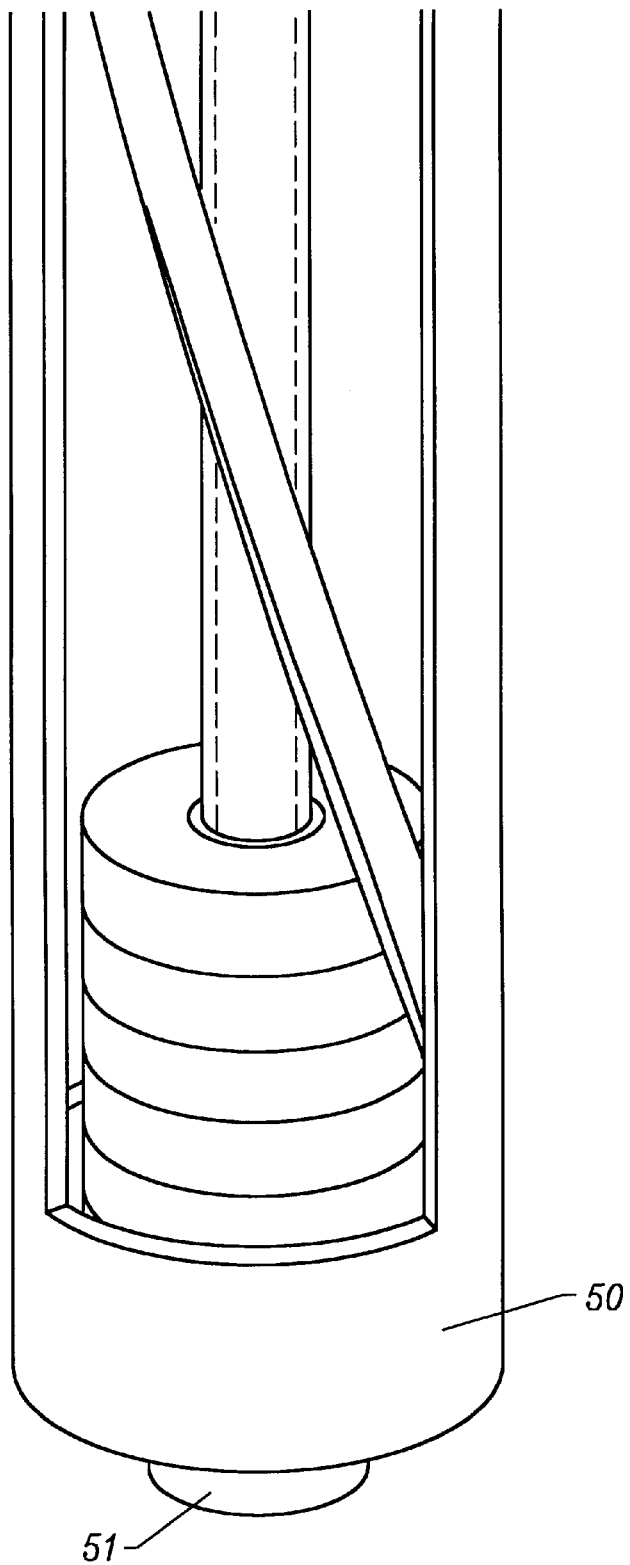
FIG. 5 is a partial perspective diagram of a weight operated mechanical drive, showing a lower rotational axis according to the invention.

FIG. 5 is a partial perspective diagram of a weight operated mechanical drive, showing a lower rotational axis according to the invention. In FIG. 5 the base portion 50 of the column is shown. It can be seen that the column rotates the retaining bar and that both rotate about a bearing 51.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A weight operated mechanical drive, comprising:
    a threaded drive screw;
    a weight that is suspended by said threaded drive screw which passes through and engages with complementary threads within a bore defined along a rotational axis thereof;
    wherein said weight turns the drive screw as it falls due to the force of gravity without said weight itself substantially rotating about said rotational axis
    a retaining bar, wherein said retaining bar is formed as a helix: and
    a wheel attached to said weight and projecting therefrom substantially perpendicular to the axis thereof, said wheel in abutting engagement with said retaining bar;
    wherein said weight is prevented from rotating about the axis of said drive screw while it is falling by said wheel which rolls against said retaining bar along said weight's path of travel.

2. The drive of claim 1, further comprising:
    a winding mechanism wherein said retaining bar winds said weight.

3. The drive of claim 2, wherein said winding mechanism rotates said retaining bar around the rotational axis of said drive screw, forcing said weight along a path defined by said drive screw threads.

4. The drive of claim 1, wherein said retaining bar is formed a round a column through which said weight drops.

5. The drive of claim 1, wherein said drive screw is helically threaded.

6. The drive of claim 1, wherein said retaining bar helix winds in the same direction of that of the threads on said drive screw, and at a pitch that is almost at right angles to the pitch of said drive screw threads; and wherein torque imparted to said drive screw by said weight is not changed during winding of said weight.

* * * * *